(12) United States Patent
Yasuda (10) Patent No.: US 8,837,028 B2
(45) Date of Patent: Sep. 16, 2014

(54) LIGHT SCATTERING ELEMENT, OPTICAL SCANNING DEVICE, AND IMAGE DISPLAYING DEVICE

(75) Inventor: Yoshiaki Yasuda, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 58 days.

(21) Appl. No.: 13/396,952

(22) Filed: Feb. 15, 2012

(65) Prior Publication Data

US 2012/0218615 A1    Aug. 30, 2012

(30) Foreign Application Priority Data

Feb. 24, 2011    (JP) ................. 2011-038332

(51) Int. Cl.
G02B 26/08    (2006.01)
G02B 26/10    (2006.01)
G02B 26/12    (2006.01)
G02B 5/02    (2006.01)
G02B 26/00    (2006.01)
G02B 27/48    (2006.01)

(52) U.S. Cl.
CPC .............. G02B 27/48 (2013.01); G02B 26/105 (2013.01); G02B 5/0215 (2013.01); G02B 26/00 (2013.01)
USPC .................................... 359/209.1; 359/197.1

(58) Field of Classification Search
USPC ............ 359/201.1, 208.1, 209.1, 212.2, 230, 359/298, 198.1–199.4, 200.6–200.8, 202.1, 359/221.2, 223.1–225.1, 226.2, 904, 359/290–295, 838, 846, 871, 872, 197.1; 250/204, 559.06, 559.29, 230, 234; 347/255–260; 353/39, 98–99; 385/15–18, 22; 398/12, 19, 45
See application file for complete search history.

(56) References Cited

U.S. PATENT DOCUMENTS

2008/0203856 A1*  8/2008  Miyazawa ................. 310/358
2010/0245966 A1*  9/2010  Yasuda ..................... 359/224.1

FOREIGN PATENT DOCUMENTS

| JP | 2002-062582 |  | 2/2002 |  |
| JP | 2004-138669 |  | 5/2004 |  |
| JP | 2005-148459 |  | 6/2005 |  |
| JP | 2005148459 A | * | 6/2005 | ............. G02B 26/10 |

* cited by examiner

*Primary Examiner* — William Choi
*Assistant Examiner* — Sharrief Broome
(74) *Attorney, Agent, or Firm* — Rankin, Hill & Clark LLP (57) ABSTRACT

A light scattering element 1 is equipped with a transparent, thin film-like optical element 2 which scatters incident laser light, and a thin film-like piezoelectric element 4, which is sandwiched between two electrodes 3a, 3b and which is laminated on a surface of the optical element 2 that is different from an optical scattering surface 2a. The light scattering element 1 averages a speckle pattern of laser light scatted by the optical scattering surface 2a and emitted therefrom by vibration of the piezoelectric element 4 generated when alternating voltage is applied between the two electrodes 3a, 3b.

12 Claims, 6 Drawing Sheets

LIGHT SCATTERING ELEMENT, OPTICAL SCANNING DEVICE, AND IMAGE DISPLAYING DEVICE

BACKGROUND OF THE INVENTION

1. Field of the Invention

The present invention relates to a light scattering element, an optical scanning device, and an image displaying device which reduces speckle noise of laser light.

2. Description of the Related Art

Conventionally, there has been proposed, as one embodiment of an image display device, a projection display which displays an image on a screen, by projecting light from a light source to the screen while deflecting the same with a light deflector. As the light deflector, for example, a light deflector which integrally forms mechanical components such as a mirror and a piezoelectric actuator on a semiconductor substrate, has been proposed. This light deflector is one type of MEMS (micro electro mechanical systems) device using semiconductor process or micromachine technology (for example, refer to Japanese Patent Laid-Open No. 2005-148459). In this light deflector, one end of the piezoelectric actuator is coupled to a frame unit (supporting unit) and is supported thereby. The torque generated by the piezoelectric actuator is transmitted to a torsion bar (elastic beam) connected to the other end of the piezoelectric actuator, and rotary drives the mirror equipped at the leading end of the torsion bar. Such light deflector has a merit that large driving force may be obtained with a compact and simple structure.

In the projection display mentioned above, a technology which uses laser light source such as a semiconductor laser for the light source thereof has been proposed. The laser light source has long lifetime of the light source compared to a lamp, has high energy conversion efficiency, and has high chromatic purity of light's three prime colors. However, in the case where the laser light source is used as the light source, there arises a problem that speckle noise (granular interference pattern) is generated and the image quality becomes degraded. The speckle noise is a phenomenon generated when coherent light in which phase from the laser light source is uniform is scattered by a random (having fine irregularity) phase front (object surface), and the scattered light from adjacent region on the object surface interfere on a viewing screen. The speckle noise appears as a granular intensity distribution (spotty pattern) on the viewing screen.

In the projection display using laser light source, if such speckle noise is generated between the screen as the object surface and eyes (retinas) of an observer as the viewing screen, the observer recognizes the degradation of the image. That is, the speckle noise is superimposed on the image which significantly degrades the image quality. Various techniques has been proposed in order to reduce such speckle noise (for example, refer to Japanese Patent Laid-Open No. 2002-62582, Japanese Patent Laid-Open No. 2004-138669).

The image display device of Japanese Patent Laid-Open No. 2002-62582 reduces the speckle noise by spatially changing the deflecting state of incident laser light by a polarized light distribution changing means. To be more specific, the image display device displays the image by a light emitted from a light source and modulated by a space modulator, and converts a spatial polarized light distribution of the light emitted from the light source so that the polarization directions of the light input to the adjacent pixels of the space modulator becomes orthogonal to each other. Because polarized light orthogonal to each other does not interfere with one another, the speckle noise by the interference of regions corresponding to the adjacent pixels of the space modulator is suppressed in the displayed image.

On the other hand, the image display device of Japanese Patent Laid-Open No. 2004-138669 does not change the polarized state of incident laser light, but changes the scattering direction variously by inserting a light scattering element in a light path between the laser light source and the space modulator for image formation, and vibrating the light scattering element at high speed with a driving mechanism (vibrating means for applying vibration). By doing so, an approach for reducing a speckle contrast by averaging the speckle pattern has been made.

However, in the devices disclosed in Japanese Patent Laid-Open No. 2002-62582 and Japanese Patent Laid-Open No. 2004-138669, it is necessary to provide, in addition to the light deflector, the optical element or the driving mechanism to the optical system for reducing the speckle noise. More specifically, in the technology of Japanese Patent Laid-Open No. 2002-62582, it becomes necessary to provide the polarized light distribution changing means, and to expand a radius of laser light more than the size of a polarized light element of the polarized light distribution changing means. Therefore, either additional lens becomes necessary or the size of the optical system becomes larger. Further, in the technique disclosed in Japanese Patent Laid-Open No. 2004-138669, it is necessary to further add the driving mechanism such as the vibrating means for vibrating the light scattering element. As such, in the techniques such as those disclosed in Japanese Patent Laid-Open No. 2002-62582 and Japanese Patent Laid-Open No. 2004-138669, various problems arose such as increase in the number of components, increase in the size as the system, increase in power consumption, and burden of optical alignment.

SUMMARY OF THE INVENTION

The present invention is made in view of above background and aims to provide a light scattering element capable of decreasing the speckle noise of laser light, by forming the element itself to be capable of vibrating. Further, the present invention aims to provide an optical scanning device and an image projecting device capable of reducing the speckle noise of laser light, by using the light scattering element, without providing additional lens or driving mechanism such as a vibrating means, which is compact and has simple structure.

The present invention provides a light scattering element which scatters laser light incident from a laser light source, comprising: a transparent, thin film-like optical element having a scattering surface which scatters incident laser light; and a thin film-like piezoelectric element, which is sandwiched between two electrodes and which is laminated on a surface of the optical element that is different from the scattering surface; wherein a speckle pattern of laser light scattered by the scattering surface and emitted therefrom is averaged by vibration of the piezoelectric element generated when alternating voltage is applied between the two electrodes.

According to the present invention, the piezoelectric element which vibrates the optical element for changing the speckle pattern is formed integrally by being laminated on the optical element. As such, by vibrating the optical scattering element with the vibration of the piezoelectric element, it becomes possible to reduce the speckle noise by averaging the speckle pattern. In the case where such optical scattering element is used for the optical scanning device or the image projecting device, the optical scanning device or the image projecting device may further be made smaller, because there is no need to separately provide additional lens or driving mechanism for vibrating the same.

In the present invention, it is preferable that a direction of vibration of the piezoelectric element is a direction orthogonal to an optical axis of the incident laser light. As such, it becomes possible to emit the incident laser light while including the vibrating component therein. This varies the phase difference of the laser light, and makes it possible to superimpose laser light with the phase difference varied on the retinas of the observer within the response time of the eyes and to create more light averaged in a temporal axis. Therefore, it becomes possible to reduce the speckle noise more effectively. In the present invention, "orthogonal" does not necessary be exactly 90°, and may be an angle near 90°.

In the present invention, it is preferable that the piezoelectric element is applied with the alternating voltage which makes the piezoelectric element vibrate at a resonance frequency. By doing so, larger amplitude is obtained by resonate vibration, so that it becomes easier to scatter light by the optical element, and it becomes possible to reduce the speckle noise more effectively.

In the present invention, it is preferable that the piezoelectric element is configured from a lead-based perovskite-type compound. The lead-based perovskite-type compound has higher piezoelectricity compared to polyvinylidene difluoride (PVDF) and the like. Therefore, by using the lead-based perovskite-type compound which has higher piezoelectricity compared to polyvinylidene difluoride and the like, it becomes possible to vibrate the optical element larger, and to reduce the speckle noise more effectively.

In the present invention, in the case where the lead-based perovskite-type compound is used for the piezoelectric element, lead zirconate titanate may be used.

The present invention provides a light deflector equipped with a light scattering element which scatters the laser light incident from a laser light source, wherein the light scattering element comprises: a transparent, thin film-like optical element having a scattering surface which scatters incident laser light; and a thin film-like piezoelectric element, which is sandwiched between two electrodes and which is laminated on a surface of the optical element that is different from the scattering surface; and wherein a speckle pattern of laser light scattered by the scattering surface and emitted therefrom is averaged by vibration of the piezoelectric element generated when alternating voltage is applied between the two electrodes.

According to the present invention, in the light scattering element configured as discussed above, by vibrating the optical scattering element with the vibration of the piezoelectric element, it becomes possible to reduce the speckle noise by averaging the speckle pattern. Further, by vibrating the light scattering element, it becomes possible to scatter light emitted from the light deflector. Therefore, compared to devices where lens or driving mechanism for vibrating the same are necessary aside from the light scattering element, the light deflector may be made smaller and in a more simple configuration.

The present invention provides a light deflector equipped with an optical window comprising a light scattering element which scatters the laser light incident from a laser light source, wherein the light scattering element comprises: a transparent, thin film-like optical element having a scattering surface which scatters incident laser light; and a thin film-like piezoelectric element, which is sandwiched between two electrodes and which is laminated on a surface of the optical element that is different from the scattering surface; and wherein a speckle pattern of laser light scattered by the scattering surface and emitted therefrom is averaged by vibration of the piezoelectric element generated when alternating voltage is applied between the two electrodes.

According to the present invention, the light scattering element configured as explained above and which is capable of reducing the speckle noise is used as the optical window of the light deflector. By doing so, compared to devices where lens or driving mechanism for vibrating the same are necessary aside from the light scattering element, the light deflector may be made smaller and in a more simple configuration.

The present invention provides an image projecting device equipped with an optical window comprising a light scattering element which scatters laser light incident from a laser light source, wherein the light scattering element comprises: a transparent, thin film-like optical element having a scattering surface which scatters the incident laser light; and a thin film-like piezoelectric element, which is sandwiched between two electrodes and which is laminated on a surface of the optical element that is different from the scattering surface; and wherein a speckle pattern of laser light scattered by the scattering surface and emitted therefrom is averaged by vibration of the piezoelectric element generated when alternating voltage is applied between the two electrodes.

According to the present invention, the light scattering element configured as explained above and which is capable of reducing the speckle noise is used as the optical window of the image projecting device. By doing so, compared to devices where lens or driving mechanism for vibrating the same are necessary aside from the optical scattering element, the image projecting device may be made smaller and in a more simple configuration.

DETAILED DESCRIPTION OF THE PREFERRED EMBODIMENT

[First Embodiment]

With reference to FIG. 1 through FIG. 4, explanation will be given on a light deflector using a light scattering element of a first embodiment of the present invention, for two-dimensionally scanning laser light and forming image on a screen. In the first embodiment, a light scattering element 1 is used as an optical window of a light deflector 10.

The light scattering element 1 is equipped with an optical element 2 which is transparent and is formed into a thin film, two electrodes 3a, 3b that are transparent and are formed into thin films, and a piezoelectric element 4 which is transparent and is formed into a thin film using lead zirconium titanate (PZT).

The optical element 2 is formed from a transparent resin (for example, acryl or polycarbonate) or a glass sheet which is treated at the surface with an optical scattering surface 2a by injection molding or imprint treating. When the transparent resin sheet is used for the optical element 2, the light scattering element 1 may be made light-weight and be formed into an arbitral shape.

The optical element 2 includes the optical scattering surface 2a which is a region where a treatment for scattering light is being performed on the surface of an emission surface (upper surface in FIG. 2(b)) which is a surface where the laser light emits, and a non-optical scattering surface 2b which is a region where the surface is formed flat and no light is scattered.

One electrode 3a out of the two electrodes 3a, 3b is joined to an incident surface (lower surface in FIG. 2(b)) which is a surface of the optical element 2 where the laser light enters. Further, the two electrodes 3a, 3b are joined so as to sandwich the piezoelectric element 4. To be more specific, one surface of the piezoelectric element 4 (upper surface in FIG. 2(b)) is joined to a surface of the electrode 3a which is not joined to the optical element 2 (lower surface in FIG. 2(b)). Further, the electrode 3b is joined to the other surface of the piezoelectric element 4 (lower surface in FIG. 2(b)).

As can be seen from above, the light scattering element 1 is integrally formed by laminating the optical element 2, the electrode 3a, the piezoelectric element 4, and the electrode 3b. The manufacturing process of the light scattering element 1 will be explained later.

The two electrodes 3a, 3b are made of, for example, indium tin oxide (ITO). The layer of indium tin oxide (ITO) may be formed, for example, by sputtering method or electron beam evaporation method. Instead of indium tin oxide (ITO), tin oxide or zinc oxide may be used for the two electrodes 3a, 3b. Further, the surfaces of the light scattering element 1, that is, "the incident surface of the optical element 2" and "the surface of the electrode 3b which is opposite to the surface joined to the piezoelectric element 4", are coated at both sides with an antireflection film which prevents reflection of visible light (not shown).

Figure 1:
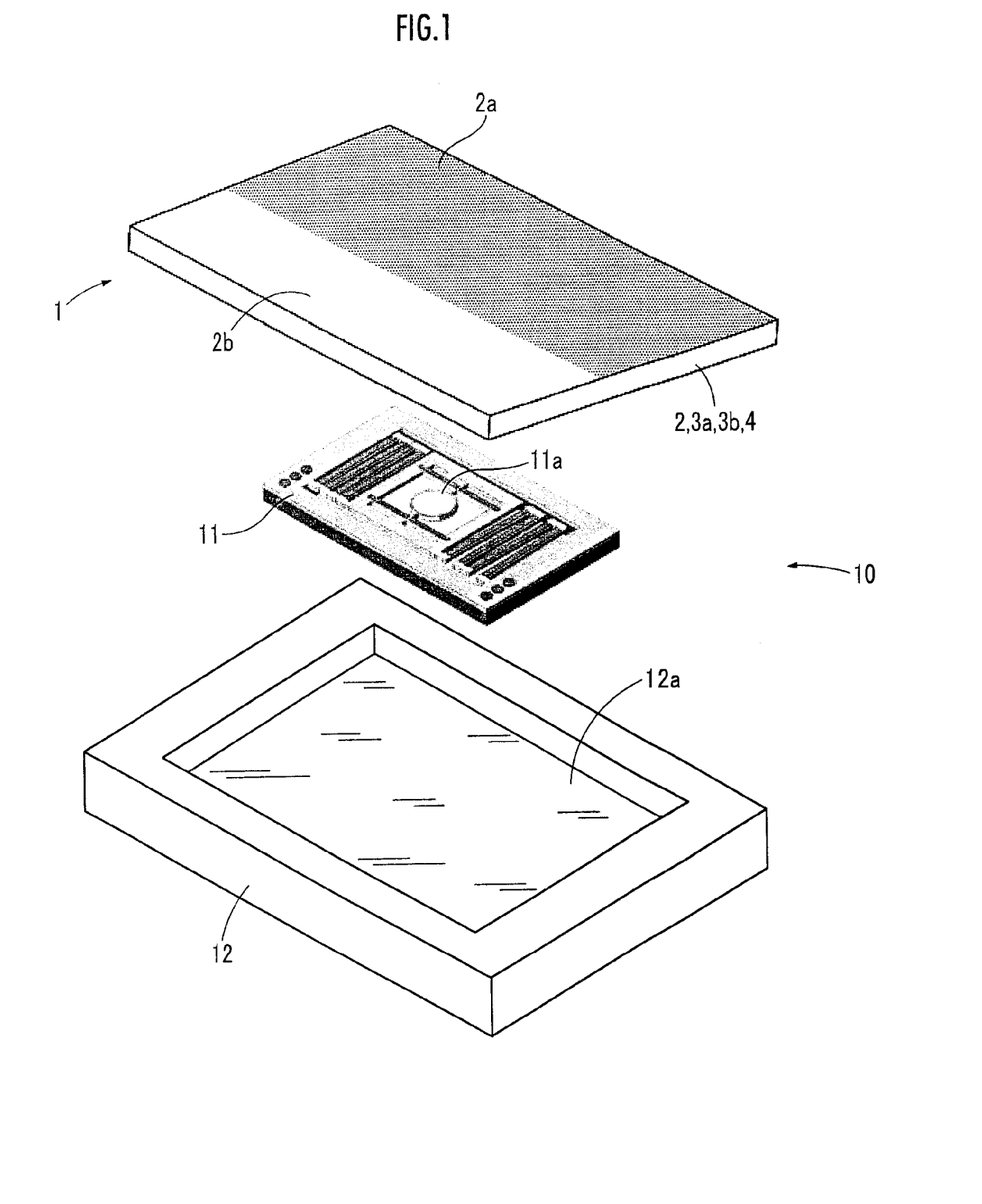
FIG. 1 is an exploded perspective view of a light deflector using a light scattering element of a first embodiment of the present invention.
Figure 2:
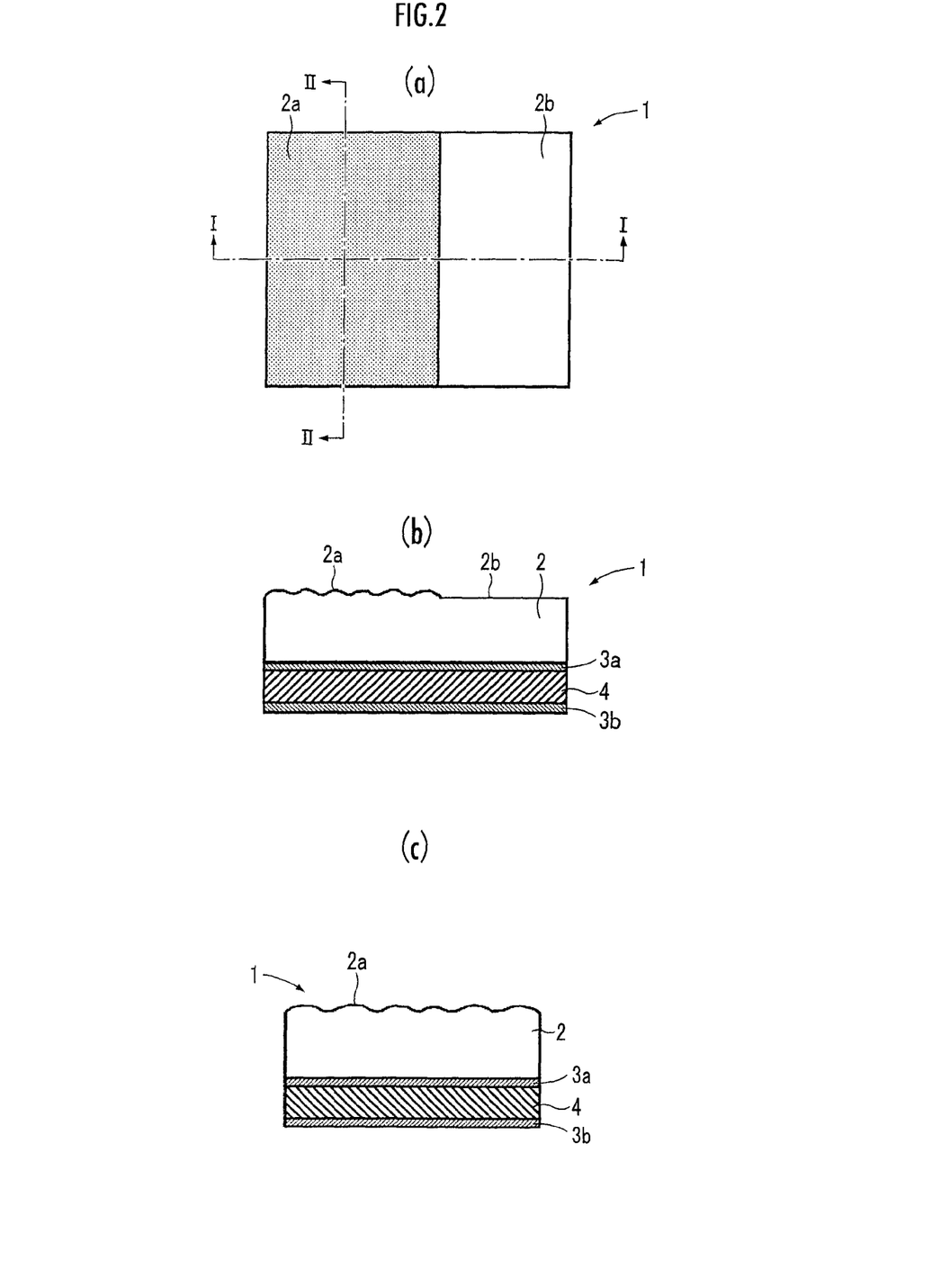
FIG. 2(a) is a planar view of the light scattering element of the first element.
FIG. 2(b) is a cross-sectional view taken along line I-I in FIG. 2(a)
FIG. 2(c) is a cross-sectional view taken along line II-II in FIG. 2(a)

The light deflector 10 is equipped with the above-mentioned light scattering element 1, a light deflecting member 11 for deflecting light, and a package 12 which becomes a shell. The light deflector 10 uses the light scattering element 1 as the optical window which emits light deflected by the light deflecting member 11.

The light deflector 10 is configured so as to electrically connect two power-feeding electrode pads (not shown) respectively corresponding to the two electrodes 3a, 3b of the light scattering element 1 to the two electrodes 3a, 3b by soldering or a conductive paste. And the light deflector 10 makes the piezoelectric element 4 vibrate by applying alternating voltage to the two electrode pads. At this time, the light deflector 10 applies the alternating voltage which makes the piezoelectric element 4, and consequently the light scattering element 1 vibrate minutely at high speed, to the two electrode pads. At this time, the light deflector 10 applies the alternating voltage which makes the piezoelectric element 4 and consequently the light scattering element 1 vibrate at a resonant frequency (that is, the frequency of the alternating voltage is set to the resonant frequency). By doing so, the mechanical energy converted with respect to the same electric energy becomes larger, and the amplitude of the light scattering element 1 may be made larger effectively.

The light deflecting member 11 is equipped with an oscillating mirror 11a for reflecting light, and is configured so as to be able to rotary drive the oscillating mirror 11a arbitrarily. By doing so, the light deflector 10 is capable of emitting light reflected by the oscillating mirror 11a to an arbitral direction, and is capable of two-dimensionally scanning the laser light and form image on the screen.

The package 12 has an opening 12a, and the overall light deflecting member 11 is stored in the opening 12a. At this time, the light deflecting member 11 is stored so that the surface of the oscillating mirror 11a which reflects light (upper surface in FIG. 1) becomes the same direction as the surface on the opening side of the package 12 (upper surface in FIG. 1). The light scattering element 1 is inserted into the opening 12a of the package 12, without giving consideration to optical alignments such as the distance from the light deflecting member 11 and the like.

Figure 3:
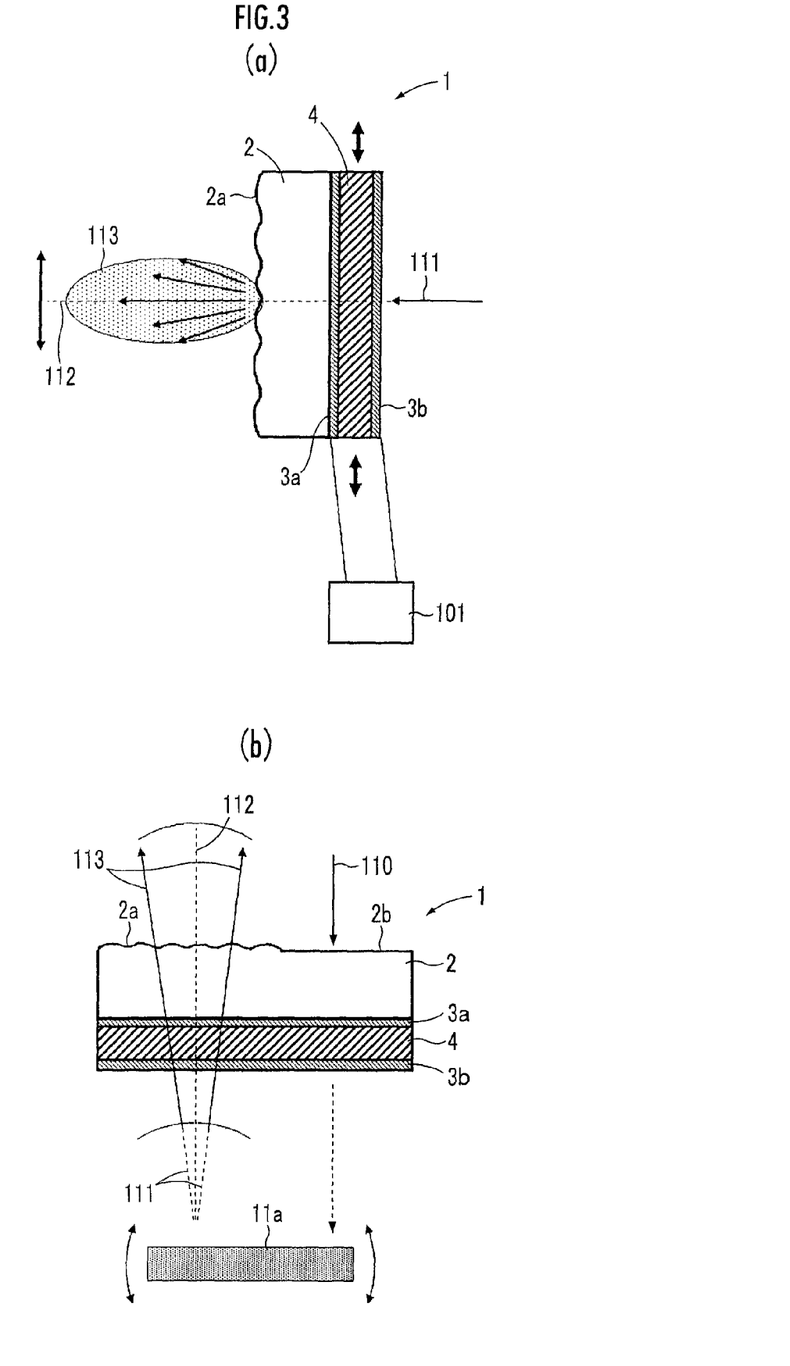
FIG. 3(a) is a cross-sectional view taken along line I-I in FIG. 2(a)
FIG. 3(b) is a view explaining averaging of speckle pattern by the light scattering element, using cross-sectional view taken along line II-II in FIG. 2(a)

Next, explanation will be given on the principle of averaging the speckle pattern by the light scattering element 1 which is configured as mentioned above. FIG. 3 is an explanatory view of the principle of averaging the speckle pattern by the light scattering element 1. FIG. 3(a) shows the cross-sectional diagram of the light scattering element 1 and a drive circuit 101 for vibrating the piezoelectric element 4 taken along line II-II in FIG. 2(a). FIG. 3(b) is an explanatory view in the case where the light scattering element 1 is used as the optical window of the light deflector 10, and shows the light scattering element 1 in the cross-sectional diagram taken along line I-I in FIG. 2(a).

The light scattering element 1 is, as is shown in FIG. 3(a), connected so that the two electrodes 3a, 3b and the drive circuit 101 becomes a closed circuit. Further, the light scattering element 1 is arranged so that it is orthogonal to an optical axis 112 (broken line in horizontal direction in FIG. 2(a)) of a coherent light 111 which enters the incident surface of the optical element 2 (right side surface in FIG. 2(a)) (hereinafter referred to as "coherent light").

When the alternating voltage is applied between the two electrodes 3a, 3b from the drive circuit 101, the piezoelectric element 4 vibrates at a substantially orthogonal direction to the optical axis 112 of the coherent light 111. Accompanying the same, the optical scattering surface 2a of the optical element 2 integrally formed with the piezoelectric element 4 vibrates in the same direction as the piezoelectric element 4. When the optical scattering surface 2a vibrates, a scattered light 113 which is light scattered by reflecting against the optical scattering surface 2a of the optical element 2 is superimposed with the vibrating component. As is explained above, the alternating voltage is applied so that the light scattering element 1 vibrates minutely at high speed. Therefore, the superimposed vibrating component also becomes a component which vibrates minutely at high speed. With the vibrating component, the scattered light 113 vibrates at various directions by the optical scattering surface 2a, and the phase difference of light at the imaging surface varies. By doing so, light with the phase difference varied is superimposed on the retinas of an observer within a response time of the eyes, so that light averaged in a temporal axis (time average) may be created greatly. As a result, the speckle pattern is averaged, so that speckle noise may be reduced effectively.

By scattering the coherent light 111 entering the light scattering element 1 and averaging the speckle pattern, by vibrating the optical scattering surface 2a at high speed, it becomes possible to effectively reduce the speckle noise appearing on the screen.

FIG. 3(b) is an explanatory view in the case where the incident light 110 is deflected by the reflection and oscillation of the oscillating mirror 11a of the light deflector 10 and is emitted from the light scattering element 1. The light 110 entering the light scattering element 1 from the laser light source enters the oscillating mirror 11a of the light deflecting member 11 via the non-optical scattering surface (surface formed flat) 2b of the optical element 2. Because the incident light 110 is not scattered, the resolution of the coherent light (in FIG. 3(b), a reflected scanning light from the oscillating mirror 11a) 111 which forms the projected image does not drop (become worse).

Thereafter, the light deflected by the oscillating mirror 11a is emitted to outside the light scattering element 1, that is, outside the light deflector 10, via the optical scattering surface 2a of the optical element 2. The optical scattering surface 2a is formed so that it gives minimum scattering for achieving the objective of averaging the speckle pattern generated by the coherence of the coherent light 111. Therefore, the influence on the resolution by the coherent light (reflected scanning light)111 is extremely small.

As is explained above, the light scattering element 1 averages the speckle pattern by acting only on the light 111 deflected by the oscillating mirror 11a, so that it becomes possible to average the speckle pattern and reduce the speckle noise on the screen, without reducing the resolution of the image projected on the screen.

Next, explanation will be given on the manufacturing process of the light scattering element 1.

Conventionally, lead-based perovskite-type compound (oxide) represented by lead zirconate titanate (PZT) is known as a material having high piezoelectricity. PVDF, the representative example of the piezoelectric polymer, has the piezoelectric constant d31, which is an index of performance for converting electric energy into mechanical energy, of 20 pm/V, and the electromechanical coupling factor k of 0.1. On the other hand, PZT has the piezoelectric constant d31 of 110 pm/V, and the electromechanical coupling factor k of 0.6-0.8, that are higher compared to those of PVDF. Therefore, the lead-based perovskite-type compound is largely advantageous over the piezoelectric polymer in application as an actuator. However, heretofore, the lead-based perovskite-type compound has been mainly applied as bulk ceramics, and practically no consideration has been given on applications which require sheet shape or transparency.

Recently, thin film made of lead-based perovskite-type compound having equivalent piezoelectricity as in the case of being applied as the bulk ceramics has been produced, by solution coating method, sputtering method, ion-plating method and the like. With a film thickness of approximately 10-50 μm, even PZT has a transmission factor of 80% or more in a visible light region. As such, even in the case where PZT is used as the piezoelectric element, it can be treated as a transparent film. However, the temperature which grows the lead-based perovskite-type compound such as PZT as a thin film is high at 500° C. or more, so that it can only be grown on a substrate having heat endurance. As the substrate material, silicon wafer is the most common material, and besides this, stainless-steel, magnesium oxide single crystal, quartz and the like are being used. As such, the substrate material must have heat endurance, so that the lead-based perovskite-type compound cannot be grown directly on the resin or glass forming the optical scattering surface 2a.

However, as is shown in process from FIG. 4(i) to be explained later, the lead-based perovskite-type compound such as PZT may be exfoliated and transcripted from a growing substrate onto the optical element (resin and glass sheet) 2 of the light scattering element 1 as a desired pattern. Therefore, the lead-based perovskyte-type compound such as PZT may be used as the material for the piezoelectric element 4. By doing so, the piezoelectric element 4 may be formed integrally with the optical element 2 having the optical scattering surface 2a, as a piezoelectric vibrating source having high transparency and high piezoelectricity. Therefore, there is no need to select transparent member, such as lead lanthanum zirconate titanate (PLZT) or polyvinylidene difluoride (PVDF) having low piezoelectric performance, as the material for the piezoelectric element 4.

Further, by using the lead-based perovskite-type compound such as PZT having high piezoelectric performance as the piezoelectric element 4 of the light scattering element 1, efficiency for converting electric energy into mechanical energy is increased, so that electric voltage to be applied to the two electrodes 3a, 3b may be decreased.

Numerous research and development cases have been reported on a lower electrode structure of the lead zirconate titanate (PZT) film (hereinafter referred to as PZT film) and on an adhesion layer with the substrate. Among these, it is most common to form titanium (Ti) as the adhesion layer below the lower electrode of platinum (Pt). This is because an oxide ($TiO_x$) is formed at the boundary between the silicone thermally-oxidized film ($SiO_2$) at the surface of the substrate, which performs solid-phase diffusion in the electrode layer of Pt and a part thereof exposes to the surface of Pt. This contributes to initial nucleation during formation of PZT film and the adhesiveness of the same. On the other hand, there are many cases where the $TiO_2$ which is an oxide of Ti is formed under the lower electrode of Pt. This is aimed at preventing the surface diffusion layer of Ti from decreasing the reproducibility of film formation of PZT, or from inducing (111) preferred orientation.

Even in the lower electrode structure of Pt/$TiO_2$, PZT film having good crystalline ability. However, it has a defect that the adhesiveness with PZT film is lower compared to the lower electrode structure of Pt/Ti. Therefore, the lower electrode structure comprising three-layer structure of Pt/Ti/$TiO_2$ adopting the merits of the two structures mentioned above, has been proposed. By making the thickness of the intermediate Ti layer thinner than in the case of Ti alone, it becomes possible to adjust the balance between the adhesiveness and the degree of surface diffusion.

When manufacturing the light scattering element 1 of the present embodiment, the intermediate Ti layer of the three-layered lower electrode structure of Pt/Ti/$TiO_2$ is first partly removed by ablation with laser irradiation, and then the Pt electrode layer is formed thereon. By doing so, Ti layer is formed with exfoliation/transcription pattern as latent image before formation of PZT film. The whole of the outermost surface of the substrate upon formation of PZT film is coated with electrode of Pt. Therefore, pattern forming is possible only for the region having high adhesiveness between the PZT film and the lower electrode by the pattern of Ti layer formed as the latent image, without influencing the growth of PZT film having perovskite crystal structure.

When processing the pattern, by performing processing such as ultrasonic process or heat shock and the like to the unprocessed region in which adhesiveness with the base is decreased, the portion performed with the pattern process selectively exfoliates at the Pt/$TiO_2$ boundary tidily. That is, it becomes possible to efficiently realize exfoliation and transcription of the PZT film pattern array by self liftoff.

As the manufacturing method of the light scattering element 1, the transparent resin or the glass sheet performed with processing of the scattering surface 2a is adhered before exfoliating the PZT film pattern. By doing so, the PZT film formed on the Pt electrode is capable of being exfoliated and transcribed onto the sheet. At this state, when the Pt electrode is removed by etching or the like, the surface of the PZT film on the other side of the film is exposed. Thereafter, by forming the transparent conducting layer such as indium tin oxide (ITO), on the surface which is not on the side of the sheet with the transcribed PZT film, with the sputtering method or the electron beam evaporation method or the like, it becomes possible to apply electric voltage to the PZT film. Preferably, the size of the light scattering element is a several square millimeters, and the thickness of the PZT layer is approximately 10-50 μm taking into consideration the balance between the piezoelectric output power and transparency.

Figure 4:
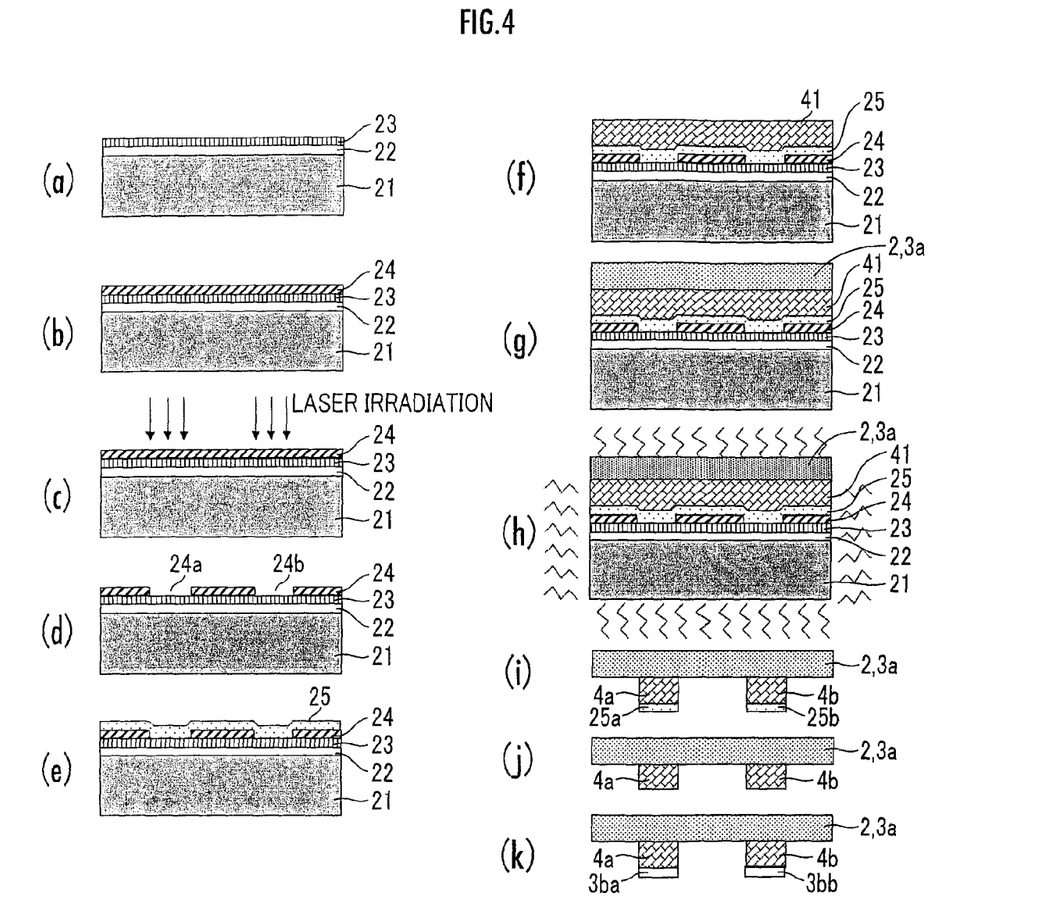
FIG. 4 is a view showing a manufacturing process of the light scattering element of the first embodiment.

FIG. 4 shows an example of the manufacturing method of the light scattering element 1 of the present embodiment. As is shown in FIG. 4(a), first a thermally-oxidized film 22 is formed on the surface of a Si wafer 21, so as to form the substrate (hereinafter, in the case where there is no need to distinguish the Si wafer 21 and the thermally-oxidized film 22, referred to as the substrate 21, 22). Thereafter, a titanium oxide (TiO2) thin film 23 is formed thereon by a magnetron sputtering method by RF bias excitation. Although there is no limitation on the specific type of wafers used for the substrate 21, 22, preferably they are either the Si wafer or SOI wafer. After forming the $TiO_2$ thin film 23, as is shown in FIG. 4(b), titan (Ti) thin film 24 is formed by the magnetron sputtering method as is similar to that explained above. Subsequently, as is shown in FIG. 4(c), concentrated laser beam of high output power is irradiated to only a part of the region of the Ti thin film 24. Thereby, the Ti thin film 24 in the region being irradiated with laser evaporates and disappears by the ablation effect. As a result, patterns 24a, 24b of the Ti thin film 24 is formed on the $TiO_2$ thin film 23, as is shown in FIG. 4(d).

The laser used therefor is, for example, an excimer laser, a third harmonic (355 nm) or a fourth harmonic (266 nm) of Nd:YAG laser. At this time, it becomes necessary for the light output of the laser to have a high output power of approximately several hundred $mJ/cm^2$. The oscillation wavelength of each typical excimer laser is 351 nm with XeF, 308 nm with XeCl, 248 nm with KrF, 222 nm with KrCl, and 193 nm with ArF. Further, preferably, the shape and the size of the laser beam used is capable of being changed to various beam profiles such as circular, rectangular, and linear, corresponding to the element design. Generally, the excimer laser is suitable in the case where the beam size is large, and the Nd:YAG laser is suitable in the case where the beam size is small. However, there is no essential difference in using either of the two lasers, because it is possible to change the beam profile of the laser beam by the optical system which condenses the laser beam.

Subsequently, as is shown in FIG. 4(e), when the Pt thin film 25 is formed by the magnetron sputtering method, the patterns 24a, 24b of the Ti thin film becomes a latent image, and the outermost surface of the substrate 11 is totally covered by the Pt thin film 25. Thereafter, as is shown in FIG. 4(f), the PZT film 41 is grown by arc discharge reactive ion plating (ADRIP) method. During this film formation, because the Pt electrode is exposed over the whole surface of the substrate 21, 22, the PZT film 41 with good crystalline performance is grown.

Thereafter, as is shown in FIG. 4(g), a transparent electrode pattern 3a, which is one electrode out of the two electrodes 3a, 3b, is formed. Then, the PZT film 41 is adhered to a resin 2 which also serves the role as the optical element 2 to which the processing of the optical scattering surface 2a is performed (hereinafter, the resin 2 and the transparent electrode pattern 3 are collectively referred to as "the resin sheet 2, 3a"). Thereafter, by performing ultrasonic treatment or heat shock treatment to the thin film layer including the PZT film 41, together with to the substrate 21, 22 (FIG. 4(h)), the PZT film 41, together with the Pt thin film 25, exfoliates at the $Pt/TiO_2$ boundary (boundary between 24 and 25) in the region where Ti, which is the adhesion layer, is removed (region other than 24a, 24b and 25a, 25b). Then, as is shown in FIG. 4(i), the exfoliation/transcription patterns 4a, 4b (the piezoelectric element 4 in the light scattering element 1) is formed by self liftoff of the PZT film 41 on the resin sheet 2, 3a.

Subsequently, as is shown in FIG. 4(j), by removing the Pt electrode 25 on the patterns 4a, 4b of the PZT film 41 by etching, the transparent piezoelectric PZT film patterns 4a, 4b are formed on the resin sheet 2, 3a. Finally, as is shown in FIG. 4(k), the light scattering element 1 is completed by forming transparent conducting films 3ba, 3bb by ITO and the like, that are other of the two electrodes 3a, 3b, by sputtering or electron beam evaporation on the surfaces of the transcribed PZT film patterns 4a, 4b that are not on the side of the resin sheet 2, 3a.

As is explained above, in the first embodiment, the light scattering element 1 which is obtained by uniformly forming in a thin film the optical element 2 and the piezoelectric element 4, so that it vibrates by the element alone, is used as the optical window of the light deflector 10. The light scattering element 1 is uniformly formed by laminating the thin films of the piezoelectric element 4 which vibrates by applying alternating voltage, and the optical element 2 having the optical scattering surface 2a which scatters light. Therefore, it becomes possible to reduce the speckle noise only with the light scattering element 1.

Further, the light deflector 10 of the first embodiment is equipped with the light scattering element 1 as the optical window. Therefore, it becomes possible to reduce the speckle noise, and at the same time, there is no necessity of adding driving mechanism such as a vibration means, so that the light deflector 10 may be made into a simple construction, and may maintain the size thereof small independently from the design of the projector body.

Further, the light scattering element 1 used in the light deflector 10 of the first embodiment includes the optical scattering surface 2a which scatters and emits light, and the non-optical scattering surface 2b which induces light without scattering the same. Therefore, it becomes possible to average the speckle pattern without reducing the resolution of the image projected on the screen, and to reduce the speckle noise on the screen.

Moreover, in the first embodiment, the speckle noise is reduced by vibrating the light scattering element 1 minutely at high speed, in order to superimpose the vibrating component on the scattered light 113 scattered by the optical scattering surface 2a. Therefore, it is only necessary to emit laser light via the vibrating light scattering element 1, and there is no need to consider the optical alignment such as the positional relationship between the light scattering element 1 and the light deflector 10. As such, it is only necessary to fit the light scattering element 1 into the opening 12a of the package 12. By doing so, it becomes possible to suppress the influence on the size, the design and the like of the light deflector 10.

[Second Embodiment]

Figure 5:
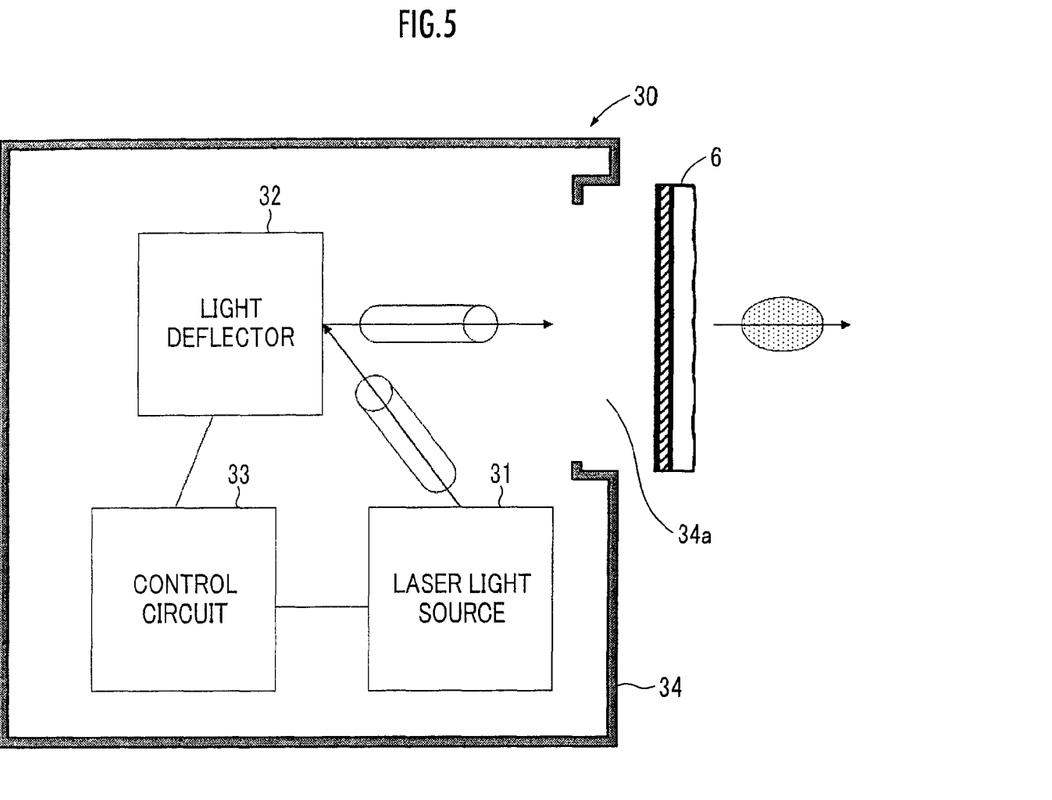
FIG. 5 is an exploded perspective view of an image projecting device using the light scattering element of a second embodiment of the present invention.
Figure 6:
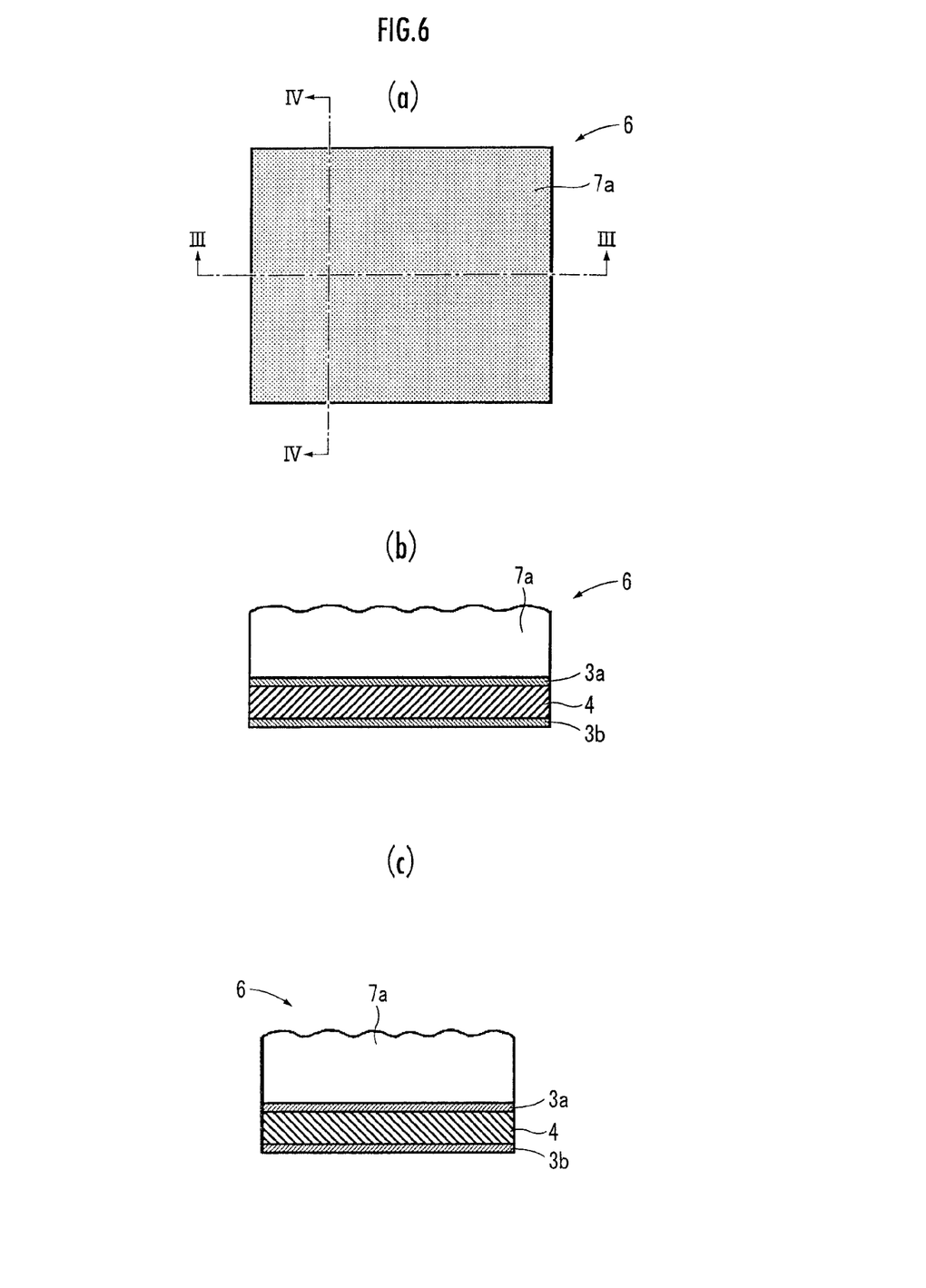
FIG. 6(a) is a planar view of the light scattering element of the second embodiment.
FIG. 6(b) is a cross-sectional view taken along line III-III in FIG. 6(a)
FIG. 6(c) is a cross-sectional view taken along line IV-IV in FIG. 6(a).

Next, with reference to FIG. 5 and FIG. 6, explanation will be given on an image projecting device for forming image on a screen by a laser light using a light scattering element of a second embodiment of the present invention. In the second embodiment, a light scattering element 6 is used as the optical window of an image projecting device 30.

The image projecting device 30 is equipped with a laser light source 31, a light deflector 32, a control circuit 33, and the light scattering element 6.

The laser light source 31 is a light source which emits laser light to the light deflector 32. The light deflector 32 deflects the laser light from the laser light source 31 by an oscillation mirror (not shown) included therein, and emits the same to outside the image projecting device 30. The control circuit 33 controls the operation of the laser light source 31 and the light deflector 32. The light deflector 32 of the second embodiment is different from the light deflector 10 of the first embodiment, and the optical window of the light deflector 32 is not configured from the light scattering element 6.

The light scattering element 6 of the second embodiment is, as is the case in the first embodiment, integrally formed by laminating an optical element 7 which is transparent and which is formed into a thin film, the two electrodes 3a, 3b that are transparent and are formed into thin films, and the piezoelectric element 4 which is transparent and which is formed into a thin film using lead zirconate titanate (PZT) into a thin film. The optical element 7 of the second embodiment is formed with a light scattering surface 7a at the overall surface of the surface emitting the incident light (upper surface in FIG. 6(b)). The optical element 7 of the second embodiment differs from the optical element 2 of the first embodiment, only in the point that no surface which does not scatter light, such as the non-optical scattering surface 2b of the optical element 2 of the first embodiment, is formed.

The light scattering element 6 of the second embodiment is fitted into an opening 34a of a frame 34 of the image projecting device 30 as the optical window. When fitting the light scattering element 6 into the image projecting device 30, there is no need to consider the optical alignment such as the distance from the light deflecting member 11 as is the case in the first embodiment, and it is only necessary to fit the light scattering element 6 into the opening 34a of the frame 34. Thereafter, two electrode pads (not shown) for power feeding corresponding to each of the two electrodes 3a, 3b of the light scattering element 6 are electrically connected to the two electrodes 3a, 3b by soldering or with conductive paste. Then, by applying alternating voltage to the electrode pads, the piezoelectric element 4 vibrates. In the image projecting device 30, the laser light emitted by the laser light source 31 is deflected by the light deflector 32, and the image projecting device 30 emits the deflected light to the outside via the light scattering element 6.

As discussed above, in the second embodiment, the light scattering element 6 as the optical window merely emits light deflected by the oscillating mirror of the light deflector 32. Therefore, there is no need for forming a surface such as the non-optical scattering surface 2b of the optical element 2 of the first embodiment on the light scattering element 6, and the same may be made into a simple structure.

As is mentioned above, in the second embodiment, the light scattering element 6 which is obtained by uniformly forming the optical element 7 and the piezoelectric element 4 into a thin film so that the same vibrates with the element alone, is used as the optical window of the image projecting device 30. Because the light scattering element 6 is obtained by uniformly laminating the piezoelectric element 4 which vibrates by applying alternating voltage thereto and the optical element 7 having the light scattering surface 7a which scatters light into a thin film, it becomes possible to reduce the speckle noise only with the light scattering element 6, as is the case in the first embodiment.

Further, the image projecting device 30 of the second embodiment is equipped with the light scattering element 6 as the optical window. Therefore, it becomes possible to reduce the speckle noise, and at the same time there is no need for adding the driving mechanism such as an oscillating means. Therefore, it becomes possible to make the image projecting device 30 in a simple configuration, and to maintain the size thereof small independently of the design of the projector body.

Further, the light scattering element 6 used as the optical window of the image projecting device 30 of the second embodiment differs from the case of the light scattering element 1 used as the optical window of the light deflector 10 in the first embodiment, and merely emits light deflected by the oscillating mirror of the light deflector 32. Therefore, in the light scattering element 6 of the second embodiment, there is no need to form a surface such as the non-optical scattering surface 2b of the optical element 2 of the first embodiment, so that it may be made in a simple configuration.

Moreover, in the second embodiment, the speckle noise is reduced by vibrating the light scattering element 6 minutely at high speed, in order to superimpose the vibrating component on the scattered light 113 scattered by the optical scattering surface 7a. Therefore, as is the case in the first embodiment, it is only necessary to emit laser light via the vibrating light scattering element 6, and there is no need to consider the optical alignment such as the positional relationship between the light scattering element 6 and the light deflector 32. As such, it is only necessary to fit the light scattering element 6 into the opening 34a of the frame 34. By doing so, it becomes possible to suppress the influence on the size, the design and the like of the image projecting device 30.

Further, in the first embodiment and the second embodiment, the vibrating direction of the light scattering element 1 which vibrates with the piezoelectric element 4 is arranged so that it becomes the direction orthogonal to the light axis of the incident laser light. By doing so, it becomes possible to superimpose the vibrating component to the scattering light 113 scattered by the optical scattering surface 2a efficiently, and to reduce the speckle noise effectively.

Further, in the first embodiment and the second embodiment, the alternating voltage is applied to the two electrodes 3a, 3b, so that the light scattering element 1 vibrates at the resonant frequency of the light scattering element 1 which vibrates with the piezoelectric element 4. By doing so, the electric energy of the alternating voltage may be converted effectively to the mechanical energy, and the light scattering element 1 may be vibrated largely.

In the first and the second embodiments, lead zirconate titanate (PZT) is used as the material for the piezoelectric element. However, it is not limited thereto, and a material excelled in piezoelectricity may be used. For example, it may be any one material of the lead-based perovskite-type compound. By using material excelled in piezoelectricity to the piezoelectric element 4, it becomes possible to decrease the voltage applied to the two electrodes 3a, 3b, and to suppress energy consumption.

Further, explanation has been given on the case where the light scattering elements of the first and the second embodiments are used as the optical window of the light deflector or the image projecting device, however the optical apparatus using the light scattering element is not limited thereto. For example, various application such as a compact laser projector mounted on a mobile equipment, a head-up display mounted in a car, a projection display for an instrument panel of a vehicle, a projection display for A pillar (front pillar) of a vehicle, may be considered.

What is claimed is:

1. A light scattering element which scatters laser light incident from a laser light source, comprising:
   a transparent, thin film-like optical element having a scattering surface which scatters the incident laser light, wherein the scattering surface is processed with light scattering treatment; and
   a thin film-like piezoelectric element, which is sandwiched between two electrodes and which is laminated on a surface of the optical element that is different from the scattering surface;
   wherein a speckle pattern of laser light scattered by the scattering surface and emitted therefrom is averaged by vibration of the piezoelectric element generated when alternating voltage is applied between the two electrodes.

2. The light scattering element according to claim 1, wherein a direction of vibration of the piezoelectric element is a direction orthogonal to an optical axis of the incident laser light.

3. The light scattering element according to claim 1, wherein the piezoelectric element is applied with the alternating voltage which makes the piezoelectric element vibrate at a resonance frequency.

4. The light scattering element according to claim 1, wherein the piezoelectric element is configured from a lead-based perovskite-type compound.

5. The light scattering element according to claim 4, wherein the piezoelectric element is configured from a lead zirconate titanate.

6. A light deflector equipped with a light scattering element which scatters laser light incident from a laser light source, wherein
   the light scattering element comprises:
   a transparent, thin film-like optical element having a scattering surface which scatters the incident laser light, wherein the scattering surface is processed with light scattering treatment; and
   a thin film-like piezoelectric element, which is sandwiched between two electrodes and which is laminated on a surface of the optical element that is different from the scattering surface; and
   wherein a speckle pattern of laser light scattered by the scattering surface and emitted therefrom is averaged by vibration of the piezoelectric element generated when alternating voltage is applied between the two electrodes.

7. A light deflector equipped with an optical window comprising a light scattering element which scatters laser light incident from a laser light source, wherein
   the light scattering element comprises:
   a transparent, thin film-like optical element having a scattering surface which scatters the incident laser light, wherein the scattering surface is processed with light scattering treatment; and
   a thin film-like piezoelectric element, which is sandwiched between two electrodes and which is laminated on a surface of the optical element that is different from the scattering surface; and
   wherein a speckle pattern of laser light scattered by the scattering surface and emitted therefrom is averaged by vibration of the piezoelectric element generated when alternating voltage is applied between the two electrodes.

8. An image projecting device equipped with an optical window comprising a light scattering element which scatters laser light incident from a laser light source, wherein
   the light scattering element comprises:
   a transparent, thin film-like optical element having a scattering surface which scatters the incident laser light, wherein the scattering surface is processed with a light scattering treatment; and
   a thin film-like piezoelectric element, which is sandwiched between two electrodes and which is laminated on a surface of the optical element that is different from the scattering surface; and
   wherein a speckle pattern of laser light scattered by the scattering surface and emitted therefrom is averaged by vibration of the piezoelectric element generated when alternating voltage is applied between the two electrodes.

9. The light scattering element according to claim 1, wherein the surface of the optical element that is different from the scattering surface is a surface opposing the scattering surface.

10. The light scattering element according to claim 1, wherein the scattering surface is processed so that an outgoing angle of an outgoing light is different according to a relative position of the incident light with respect to the optical element for incident lights having a same angle.

11. The light scattering element according to claim 1, wherein the piezoelectric element is laminated on the surface of the optical element such that one of the two electrodes is provided directly on the surface of the optical element.

12. The light scattering element according to claim 11, wherein the piezoelectric element is laminated on the surface of the optical element such that vibration of the piezoelectric element integrally vibrates the optical element.

* * * * *